United States Patent
Hashimoto (10) Patent No.: US 10,140,706 B2
(45) Date of Patent: Nov. 27, 2018

(54) CALCIFICATION DISPLAY APPARATUS AND IMAGING APPARATUS, AND PROGRAM

(71) Applicant: General Electric Company, Schenectady, NY (US)

(72) Inventor: Hiroshi Hashimoto, Tokyo (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/327,097

(22) PCT Filed: Jul. 17, 2015

(86) PCT No.: PCT/US2015/040885
§ 371 (c)(1),
(2) Date: Jan. 18, 2017

(87) PCT Pub. No.: WO2016/011339
PCT Pub. Date: Jan. 21, 2016

(65) Prior Publication Data
US 2017/0200267 A1   Jul. 13, 2017

(30) Foreign Application Priority Data

Jul. 18, 2014 (JP) ................................. 2014-147850

(51) Int. Cl.
*G06K 9/00* (2006.01)
*G06T 7/00* (2017.01)
(Continued)

(52) U.S. Cl.
CPC .............. *G06T 7/0012* (2013.01); *G06T 5/30* (2013.01); *G06T 7/11* (2017.01); *G06T 7/50* (2017.01);
(Continued)

(58) Field of Classification Search
CPC ......... G06T 2207/30068; G06T 7/0012; G06T 7/11; G06T 2207/10028; G06T 2207/10072
(Continued)

(56) References Cited

U.S. PATENT DOCUMENTS 7,519,212 B2 *  4/2009  Brady ................... G06T 7/0012
                                                           378/37
9,652,673 B2 *  5/2017  Li .......................... G06K 9/00536

FOREIGN PATENT DOCUMENTS

JP     2003310587 A    11/2003
WO    2012085818 A1    6/2012

OTHER PUBLICATIONS

International Search Report and Written Opinion for corresponding PCT application PCT/US2015/040885 dated Nov. 9, 2015; 12 Pages.

(Continued)

*Primary Examiner* — Charlotte M Baker (57) ABSTRACT

To enable compactness of pixel regions representing possibly micro-calcified tissue in an image to be intuitively recognizable. There is provided a calcification display apparatus comprising: identifying means for identifying pixel regions representing possibly calcified tissue in an image; dilating means for dilating, for each identified pixel region, a corresponding region including that pixel region; grouping means for combining the pixel regions pertaining to the dilated corresponding regions contiguously adjoining one another into one group; and display means for displaying, for each group, at least one of the following: the pixel regions belonging to that group, dilated corresponding regions for the pixel regions, and a border enclosing the pixel regions, with color or brightness according to the number of the pixel regions belonging to that group.

10 Claims, 8 Drawing Sheets

(51) Int. Cl.
  *G06T 7/11*    (2017.01)
  *G06T 7/50*    (2017.01)
  *G06T 5/30*    (2006.01)

(52) U.S. Cl.
  CPC .............. *G06T 2207/10028* (2013.01); *G06T 2207/10072* (2013.01); *G06T 2207/10136* (2013.01); *G06T 2207/20076* (2013.01); *G06T 2207/30068* (2013.01)

(58) Field of Classification Search
  USPC ................................................ 382/131, 132
  See application file for complete search history.

(56) References Cited

OTHER PUBLICATIONS

Cheng H D et al., "Computer-Aided Detection and Classification of Microcalcifications in Mammograms: A Survey"; Pattern Recognition, vol. 36, No. 12; Dec. 1, 2003, pp. 2967-2991.

* cited by examiner

CALCIFICATION DISPLAY APPARATUS AND IMAGING APPARATUS, AND PROGRAM

CROSS-REFERENCE TO RELATED APPLICATION SECTION

This application is a filing under 35 U.S.C. 371 of international application number PCT/US2015/040885, filed Jul. 17, 2015, which claims priority to Japan application number 2014-147850, filed Jul. 18, 2014, the entire disclosure of each of which is hereby incorporated by reference.

BACKGROUND

The present invention relates to a technique of identifying pixel regions representing possibly calcified tissue in an image, and displaying a result thereof.

Conventionally, there has been proposed a system for identifying pixel regions representing microcalcifications (microscopic calcifications) in a diagnostic digital image, and displaying a box (rectangular border) around the regions representing a cluster of microcalcifications (see Abstract etc. in Patent Document 1). According to the system, an operator can objectively and intuitively recognize regions representing a cluster of microcalcifications in a diagnostic image.

SUMMARY OF THE INVENTION

The system described above, however, does not allow the operator to intuitively recognize distribution, especially, compactness, of individual microcalcifications, which is one type of information useful in image diagnosis of microcalcifications, thus still causing the operator significant difficulty in diagnosis.

In view of such circumstances, there is a need for a technique with which compactness of pixel regions representing possibly calcified tissue in an image can be intuitively recognized.

The invention in its first aspect provides a calcification display apparatus comprising:
identifying means for identifying pixel regions representing possibly calcified tissue in an image;
dilating means for dilating, for each said identified pixel region, a corresponding region including said pixel region;
grouping means for combining said pixel regions pertaining to said dilated corresponding regions contiguously adjoining one another into one group; and
display means for displaying, for each said group, at least one of the following: said pixel regions belonging to said group, dilated corresponding regions for said pixel regions, and a border enclosing said pixel regions, with color or brightness according to the number of said pixel regions belonging to said group.

The invention in its second aspect provides the calcification display apparatus in the first aspect, wherein said dilating means dilates said corresponding region around said pixel region for said corresponding region by up to a predefined rate of dilation.

The invention in its third aspect provides the calcification display apparatus in the second aspect, wherein said predefined rate of dilation is any value ranging from two to ten times (or from four to a hundred times in terms of area).

The invention in its fourth aspect provides the calcification display apparatus in any one of the first through third aspects, wherein said corresponding region has a circular or elliptical shape.

The invention in its fifth aspect provides the calcification display apparatus in any one of the first through fourth aspects, wherein:
said image is a three-dimensional image,
said corresponding region is a three-dimensional region, and
said display means displays, for each said group, at least one of the following: said pixel regions belonging to said group, said dilated corresponding regions for said pixel regions, and a border enclosing said pixel regions, with color or brightness according to the number of said pixel regions belonging to said group in a projection image in which said three-dimensional image is projected onto one plane.

The invention in its sixth aspect provides the calcification display apparatus in any one of the first through fifth aspects, wherein said display means displays the number of said pixel regions belonging to said group in correspondence with said group.

The invention in its seventh aspect provides the calcification display apparatus in any one of the first through sixth aspects, wherein said image is an ultrasonic image.

The invention in its eighth aspect provides the calcification display apparatus in any one of the first through sixth aspects, wherein said image is a radiographic image, a radiation tomographic image, or a magnetic resonance image.

The invention in its ninth aspect provides an imaging apparatus comprising imaging means for acquiring said image by imaging, and the calcification display apparatus in any one of the first through eighth aspects.

The invention in its tenth aspect provides a program for causing a computer to operate as the calcification display apparatus in any one of the first through eighth aspects.

According to the invention in the aspects described above, it is possible to identify pixel regions representing possibly calcified tissue in an image, group mutually adjacent pixel regions, and highlight the pixel regions belonging to a group with color or brightness according to the number of the pixel regions belonging to the group; thus, distribution of the pixel regions, which is one type of information useful in image diagnosis of microcalcifications, can be intuitively recognized.

DETAILED DESCRIPTION OF THE INVENTION

Embodiments of the invention will be described hereinbelow.

First, the configuration of an ultrasonic image display apparatus in accordance with the present embodiment will be described.

Figure 1:
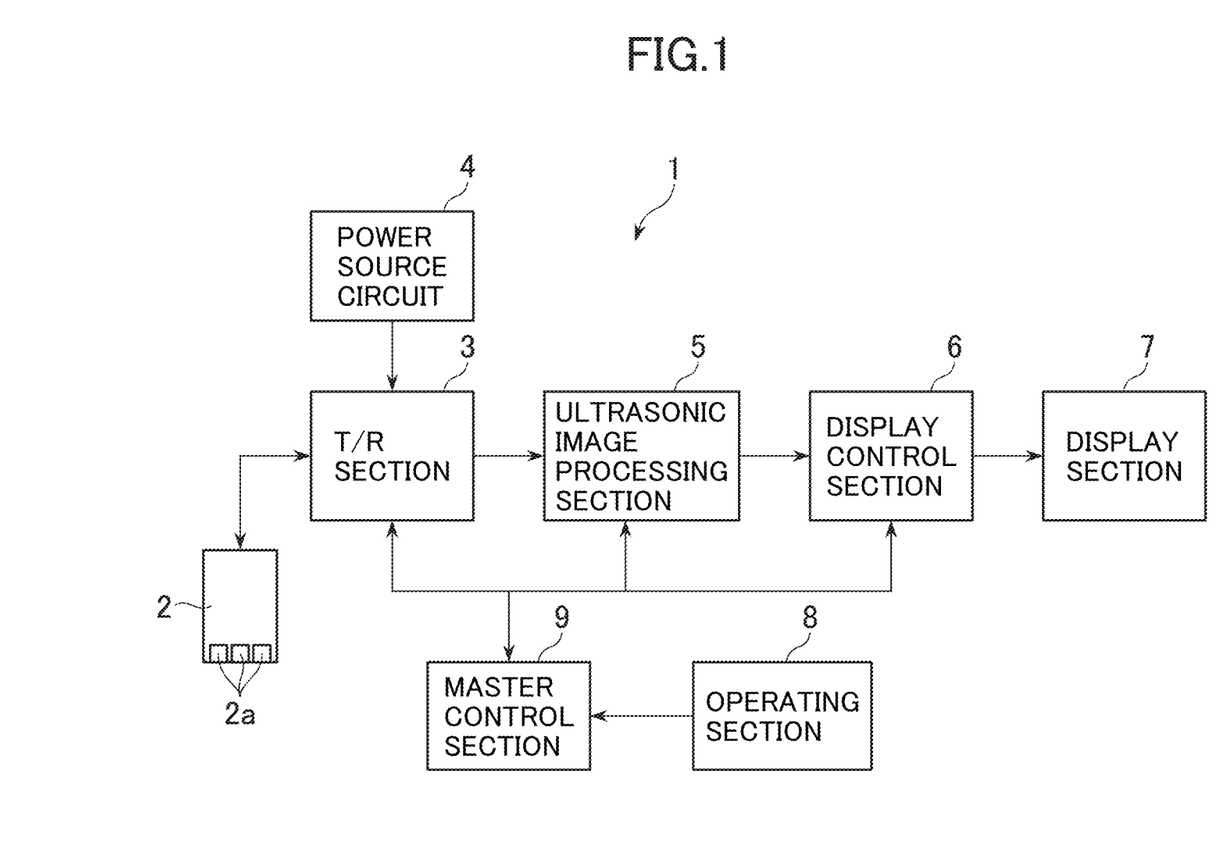
FIG. 1 is a diagram showing the configuration of an ultrasonic image display apparatus in accordance with an embodiment of the invention.

FIG. 1 is a diagram showing the configuration of an ultrasonic image display apparatus 1 in accordance with the present embodiment. As shown in FIG. 1, the ultrasonic image display apparatus 1 has an ultrasonic probe 2, a transmitting/receiving (T/R) section 3, a power source circuit 4, an ultrasonic image processing section 5, a display control section 6, a display section 7, an operating section 8, and a master control section 9.

The ultrasonic probe 2 is provided with a plurality of ultrasonic vibrators 2a for performing transmission/reception of ultrasound. When a drive pulse, which is a voltage pulse wave, is applied to the ultrasonic vibrators 2a, ultrasound is generated and transmitted to a subject.

The transmitting/receiving section 3 transmits drive pulses to the ultrasonic vibrators 2a. The transmitting/receiving section 3 also applies phased addition to echo signals of the ultrasound to form an echo signal for each acoustic line.

The power source circuit 4 supplies electric power required in transmission/reception of ultrasound to the transmitting/receiving section 3.

The ultrasonic image processing section 5 performs processing for producing an ultrasonic image on the echo signals from the transmitting/receiving section 3. For example, the ultrasonic image processing section 5 applies B-mode processing comprising logarithm compression processing, envelope detection processing, etc., color Doppler processing comprising orthogonal detection processing, filtering processing, etc., and the like. Moreover, the ultrasonic image processing section 5 scan-converts the processed signals by a scan converter to generate image data representing an ultrasonic image. Further, the ultrasonic image processing section 5 detects candidate regions of microcalcifications in an ultrasonic image represented by the generated ultrasonic image data based on the ultrasonic image data, and generates image data representing a result of the detection.

The display control section 6 displays an image based on the generated image data in the display section 7.

The display section 7 is comprised of an LCD (Liquid Crystal Display), a CRT (Cathode Ray Tube) or the like.

The operating section 8 is configured to comprise a keyboard for allowing an operator to input a command and/or information, a pointing device (not shown), and the like.

The master control section 9 controls several sections in the ultrasonic image display apparatus 1 so that an ultrasonic image is displayed. The master control section 9 sets transmission conditions for ultrasound in response to an operation by the operator. The transmission conditions include, for example, parameters defining drive pulses to be transmitted to the ultrasonic vibrators 2a, i.e., elements that determine the amplitude, pulse width, pulse repetition cycle, etc. of the drive pulses.

It should be noted that the ultrasonic image processing section 5, display control section 6, and master control section 9 may be implemented by, for example, a CPU (Central Processing Unit) reading a prespecified program from a storage section (not shown) and executing the program.

Next, the functional configuration of the ultrasonic image processing section 5 will be described.

Figure 2:
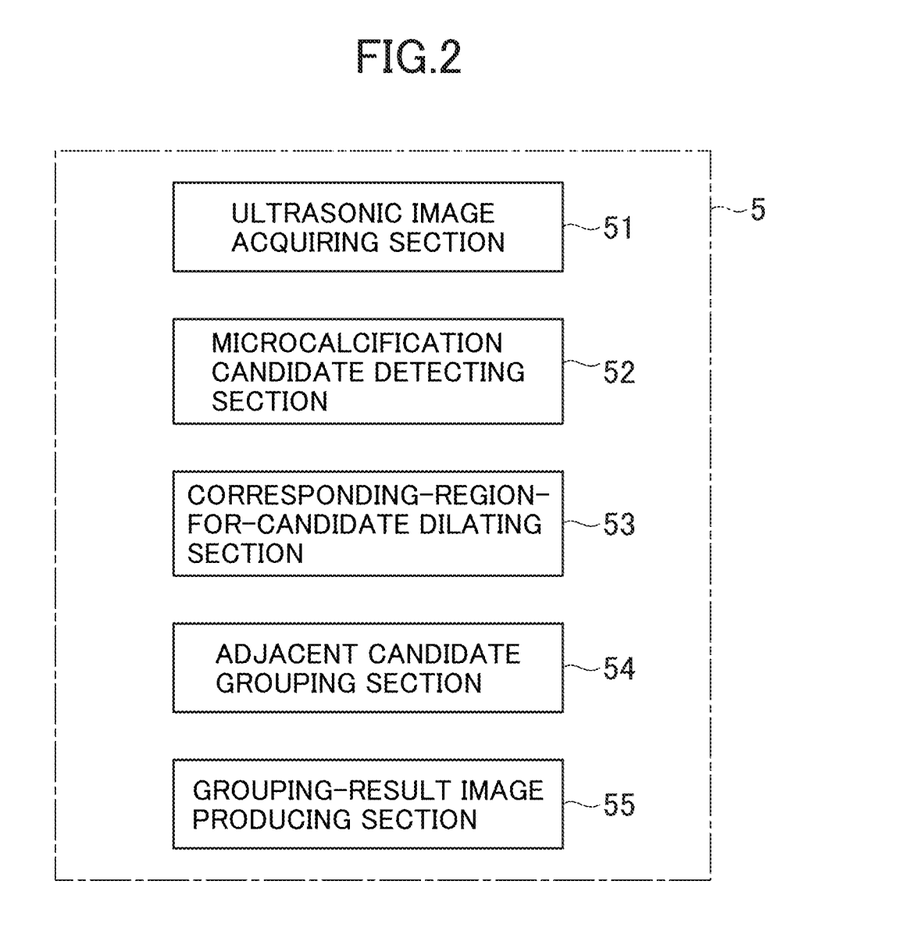
FIG. 2 is a functional block diagram showing the functional configuration of an ultrasonic image processing section.

FIG. 2 is a functional block diagram showing the functional configuration of the ultrasonic image processing section 5.

The ultrasonic image processing section 5 has an ultrasonic image acquiring section 51, a microcalcification candidate detecting section 52, a corresponding-region-for-candidate dilating section 53, an adjacent candidate grouping section 54, and a grouping-result image producing section 55.

The ultrasonic image acquiring section 51 acquires an ultrasonic image. Specifically, it generates ultrasonic image data representing an ultrasonic image in an arbitrary cross-sectional plane in a region to be imaged in the subject based on collected echo signals. For example, a breast of the subject is defined as region to be imaged, and B-mode processing is applied to echo signals from the region to repetitively generate ultrasonic image data in the arbitrary cross-sectional plane. The ultrasonic image acquiring section 51 designates a set of the generated ultrasonic image data as object to be processed by microcalcification candidate detecting processing, in response to a designating operation by the operator.

The microcalcification candidate detecting section 52 detects candidate regions of microcalcifications in an ultrasonic image represented by the ultrasonic image data to be processed. As used herein, the candidate region refers to a pixel region representing possibly calcified tissue. While the candidate region is typically granular, it may take any one of several shapes. The method of detection may be any known method, such as a method using pixel value thresholding. For example, a region in which pixels having a pixel value (brightness) equal to or greater than a predefined threshold are contiguously present in space to have an area within a certain range is identified as candidate region of microcalcifications.

Figure 3:
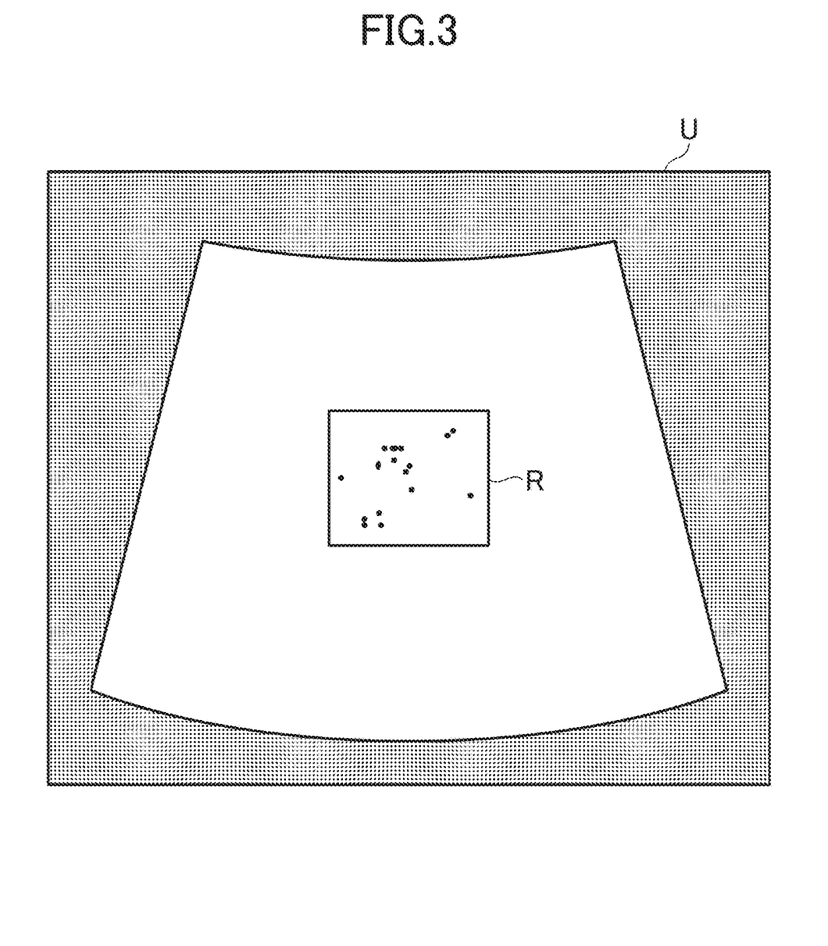
FIG. 3 diagram showing an example of hypothetical detection of candidate regions of microcalcifications.

FIG. 3 shows an example of hypothetical detection of candidate regions of microcalcifications. This example shows a process in which a large number of candidate regions are detected together in a partial region R in an ultrasonic image U of the breast.

The corresponding-region-for-candidate dilating section 53 defines a corresponding region for calculation for each detected candidate region of microcalcifications so that the corresponding region includes at least part of that candidate region. The corresponding region for calculation is basically defined as region having generally the same size and shape as the detected candidate region. However, the corresponding region for calculation may be defined to have another shape such as a circle or ellipse approximating it. Once the corresponding regions for calculation have been defined, the corresponding-region-for-candidate dilating section 53 gradually dilates the corresponding regions for calculation. The dilation of the corresponding regions for calculation is repetitively performed until the rate of dilation reaches a predefined upper limit rate. The upper limit rate may be set to an arbitrary rate by the operator. The upper limit rate may be of the order of from two to ten times, for example.

The adjacent candidate grouping section 54 groups mutually adjacent candidate regions, and counts the number of candidate regions for each group. Here, a group of candidate regions whose corresponding regions for calculation after being dilated contiguously adjoin one another are combined into one group. That is, a group of candidate regions pertaining to a plurality of corresponding regions for calculation connected from one to another without a gap, in other words, candidate regions whose corresponding regions for calculation are in direct or indirect contact with one another, are combined into one group. In particular, for example, each candidate region is initially defined as one group, and the number of candidate regions in each group is set to one. Next, during the course of dilation of the corresponding regions for calculation, when a certain corresponding region for calculation comes into contact with another corresponding region for calculation, groups to which respective candidate regions for those adjoining corresponding regions for calculation belong are combined into one new group. Then, the numbers of candidate regions in respective groups before being combined are summed up, and a resulting number is set to the number of candidate regions for the new group. This process is repetitively performed each time a corresponding region for calculation comes into contact with another corresponding region for calculation.

Figure 4:
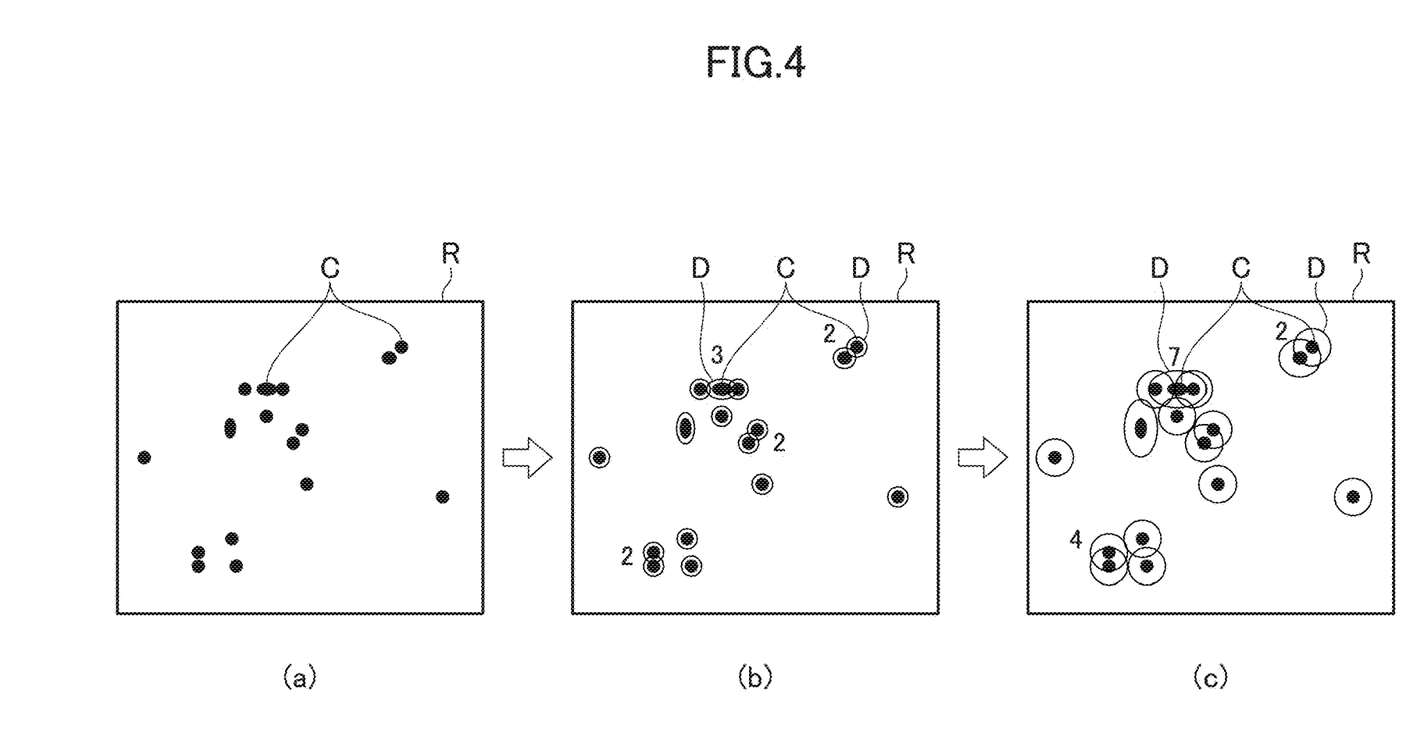
FIG. 4 is a diagram showing an example of grouping of the candidate regions of microcalcifications.

FIG. 4 shows an example of grouping of candidate regions of microcalcifications. FIG. 4(a) shows detected candidate regions C. FIG. 4(b) shows a process in which, during the course of dilation of a corresponding region for calculation D for each candidate region C, the corresponding region for calculation D comes into contact with another one to form a group. In the present example, a circular or elliptical region is defined as corresponding region for calculation D, which is represented by its contour (outer periphery). For a group having two or more candidate regions C, the number of candidate regions in that group is correspondingly displayed. FIG. 4(c) shows a condition of groups when the corresponding regions for calculation D are dilated by up to the upper limit rate. In the present example, one group having seven candidate regions, one group having four candidate regions, one group having two candidate regions, and three groups having one candidate region are finally generated.

The grouping-result image producing section 55 generates grouping-result image data, which expresses, for each group of candidate regions, at least one of the following: candidate regions belonging to that group, dilated corresponding regions for calculation for the candidate regions, and a border enclosing the candidate regions, with color or brightness (lightness) according to the number of candidate regions in that group.

Figure 5:
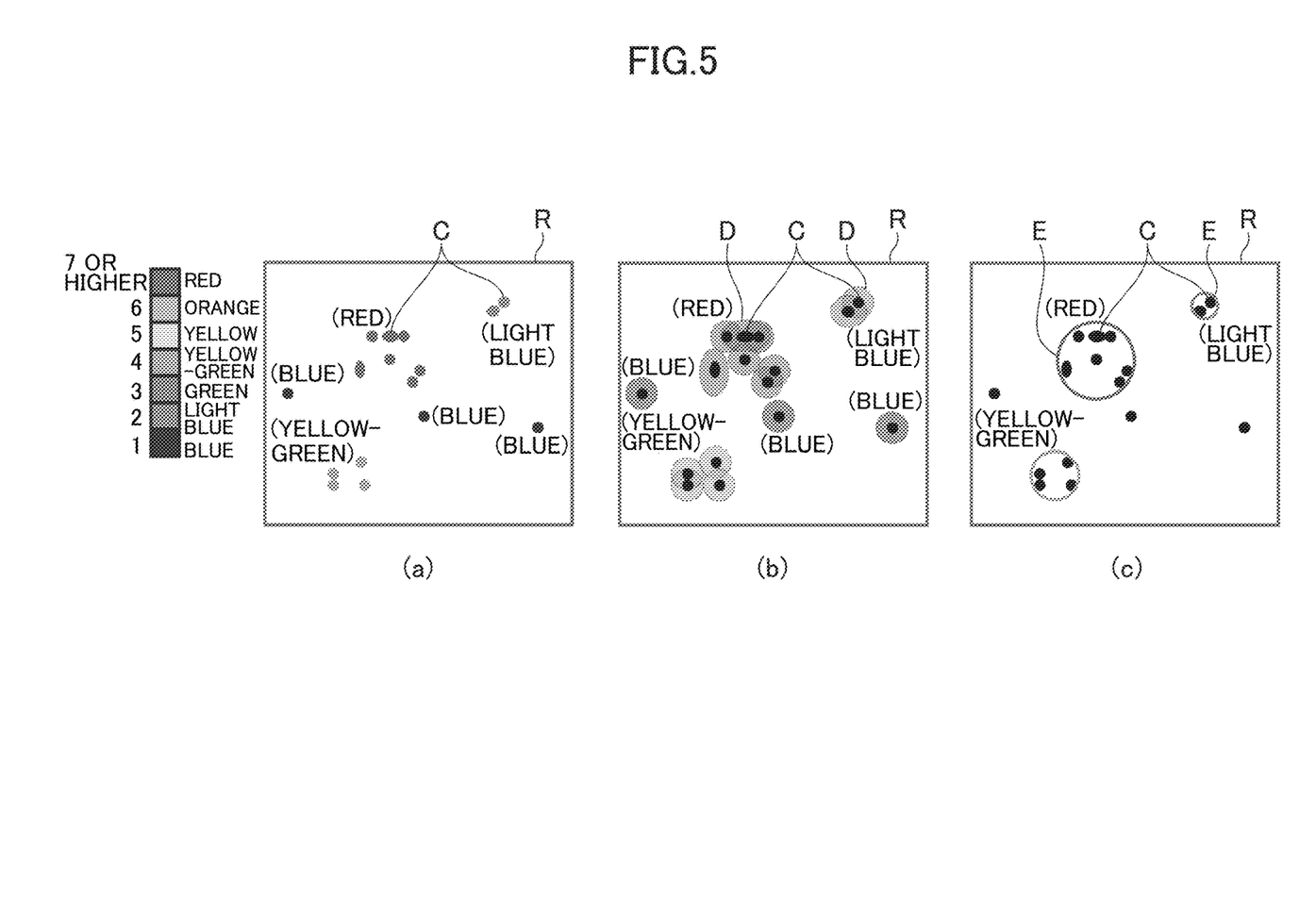
FIG. 5 is a diagram showing an example of a grouping-result image in the first embodiment.

FIG. 5 shows an example of the grouping-result image in the first embodiment. For example, as shown in FIG. 5(a), for each group, candidate regions C belonging to that group themselves are expressed by cooler colors or lower brightness for a smaller number of candidate regions in that group or warmer colors or higher brightness for a larger number of candidate regions. In particular, for example, the number of candidate regions are classified into seven levels: 1, 2, 3, 4, 5, 6, and 7 or more, and the levels are assigned with their corresponding colors: blue, light blue, green, yellow-green, yellow, orange, and red, respectively.

Alternatively, as exemplarily shown in FIG. 5(b), for each group, dilated corresponding regions for calculation D for candidate regions C belonging to that group are expressed by cooler colors or lower brightness for a smaller number of candidate regions in that group or warmer colors or higher brightness for a larger number of candidate regions.

Still alternatively, as exemplarily shown in FIG. 5(c), for each group, a circular or polygonal border E enclosing candidate regions C belonging to that group is expressed by cooler colors or lower brightness for a smaller number of candidate regions in that group or warmer colors or higher brightness for a larger number of candidate regions.

It should be noted that in the ultrasonic image U, in addition to, or in place of the expressions described above, for each group of candidate regions of microcalcifications, the number of candidate regions in that group may be superimposed in the proximity of that group, for example, so that the number is correspondingly added.

Now flow of microcalcification candidate display processing in the ultrasonic diagnosis apparatus in accordance with the first embodiment will be described.

Figure 6:
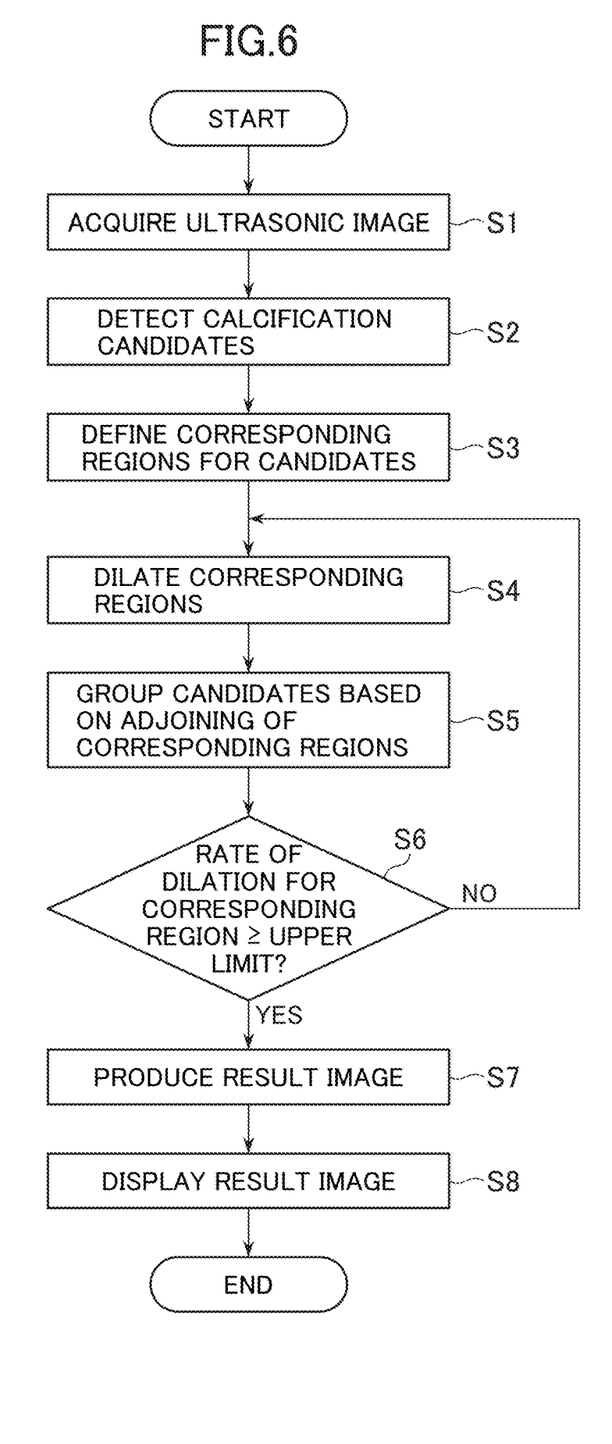
FIG. 6 is a flow chart of microcalcification candidate display processing in the ultrasonic image display apparatus in accordance with the first embodiment.

FIG. 6 is a flow chart of microcalcification candidate display processing in the ultrasonic image display apparatus in accordance with the first embodiment.

At Step S1, the ultrasonic image acquiring section 51 acquires one ultrasonic image as object to be processed by the microcalcification candidate detecting processing.

At Step S2, the microcalcification candidate detecting section 52 detects candidate regions of microcalcifications in the acquired ultrasonic image.

At Step S3, the corresponding-region-for-candidate dilating section 53 defines a corresponding region for calculation for each candidate region of microcalcifications, and also defines one group including that candidate region.

At Step S4, the corresponding-region-for-candidate dilating section 53 slightly dilates each corresponding region for calculation around its candidate region.

At Step S5, for each candidate region, once its corresponding region for calculation has come into contact with another corresponding region for calculation, the adjacent candidate grouping section 54 combines groups to which the candidate regions for the adjoining corresponding regions for calculation belong into one new group. The number of candidate regions in the new group is determined as summed value of the numbers of candidate regions in the groups before being combined.

At Step S6, the corresponding-region-for-candidate dilating section 53 decides whether a predefined upper limit rate is reached by the rate of dilation for the corresponding regions for calculation or not. When not reached, the process goes back to Step S4. When reached, the process goes to Step S7.

At Step S7, the grouping-result image producing section 55 generates grouping-result image data, which expresses, for each group, at least one of the following: candidate regions themselves belonging to that group, dilated corresponding regions for calculation for the candidate regions, and a border enclosing the candidate regions, with color or brightness according to the number of candidate regions in that group.

At Step S8, the display control section 6 displays a grouping-result image represented by the grouping-result image data.

Second Embodiment

The second embodiment extends the object to be processed by the microcalcification candidate detecting processing to a three-dimensional (3D) image. In the second embodiment, several sections constituting the ultrasonic image processing section 5 operate as follows:

The ultrasonic image acquiring section 51 produces a 3D ultrasonic image. Specifically, it generates ultrasonic image data for a plurality of successive cross-sectional planes in a region to be imaged in a subject based on collected echo signals. It then generates volume data representing a 3D ultrasonic image comprised of a plurality of two-dimensional (2D) ultrasonic images stacked one on another from the plurality of sets of ultrasonic image data. For example, echo signals collected for the breast of the subject as region to be imaged while changing the angle of the ultrasonic probe 2 are processed to generate ultrasonic image data in the plurality of successive cross-sectional planes. The ultrasonic image acquiring section 51 generates volume data representing a 3D ultrasonic image comprised of a plurality of ultrasonic images stacked one on another based on the ultrasonic image data. The data is then designated as object to be processed by the microcalcification candidate detecting processing.

The microcalcification candidate detecting section 52 detects candidate regions of microcalcifications in the 3D ultrasonic image represented by the volume data to be processed. For example, it detects a region in which pixels (voxels) having a pixel value (brightness) equal to or greater than a predefined threshold are contiguously present to have a volume within a certain range as candidate region of microcalcifications.

For each candidate region of microcalcifications, the corresponding-region-for-candidate dilating section 53 defines a 3D corresponding region for calculation including at least part of the candidate region. The corresponding region for calculation is basically defined as region having generally the same size and shape as the detected candidate region. However, the corresponding region for calculation may be defined as a sphere or ellipsoid approximating it. Once the corresponding regions for calculation have been defined, the corresponding-region-for-candidate dilating section 53 gradually dilates the corresponding regions for calculation. The dilation of the corresponding region for calculation is repetitively performed until the rate of dilation reaches a predefined upper limit rate. The upper limit rate may be set to an arbitrary rate by the operator. The upper limit rate may be of the order of from two to ten times, for example.

During the course of dilation of the corresponding regions for calculation, when a certain corresponding region for calculation comes into contact with another corresponding region for calculation, the adjacent candidate grouping section 54 combines groups to which respective candidate regions for the adjoining corresponding regions for calculation belong into one new group, as in the first embodiment. In this way, mutually adjacent candidate regions are grouped, and the number of candidate regions is counted for each group.

The grouping-result image producing section 55 projects the 3D ultrasonic image and the dilated corresponding regions for calculation for the candidate regions of microcalcifications onto one arbitrary plane to produce their projection image. Moreover, the grouping-result image producing section 55 generates grouping-result image data, which expresses, for each group, at least one of the following: candidate regions themselves belonging to that group, dilated corresponding regions for calculation for the candidate regions, and a border enclosing the candidate regions, with color or brightness according to the number of candidate regions in that group in the projection image.

Figure 7:
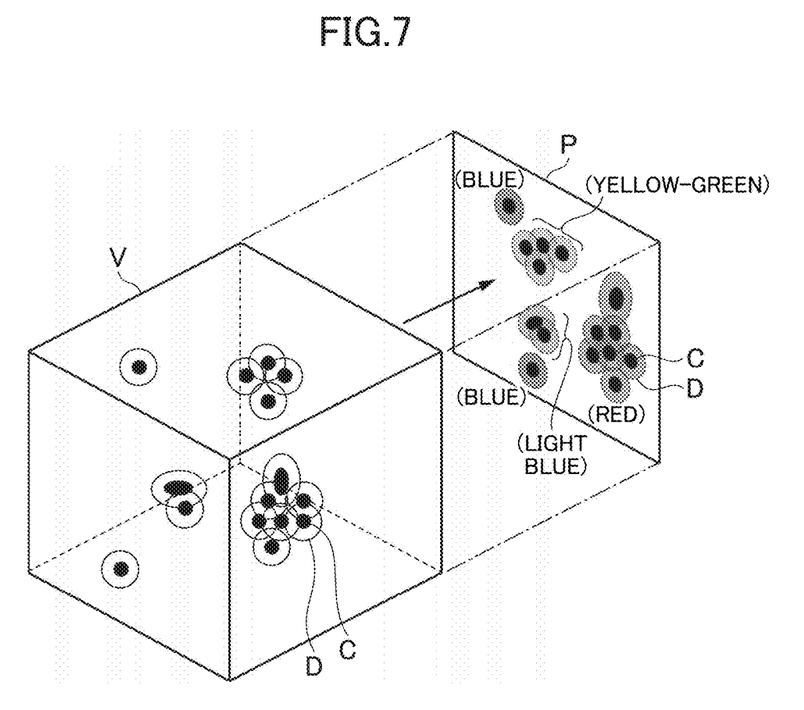
FIG. 7 is a diagram showing an example of a grouping-result image in a second embodiment.

FIG. 7 shows an example of the grouping-result image in the second embodiment. For example, as shown in FIG. 7, the 3D ultrasonic image V is projected along with the corresponding regions for calculation D onto one arbitrary plane to produce a projection image P. In the projection image P, for each group of candidate regions, dilated corresponding regions for calculation D for the candidate regions C belonging to that group are expressed by cooler colors or lower brightness for a smaller number of candidate regions in that group or warmer colors or higher brightness for a larger number of candidate regions.

Now flow of microcalcification candidate display processing in the ultrasonic diagnosis apparatus in accordance with the second embodiment will be described.

Figure 8:
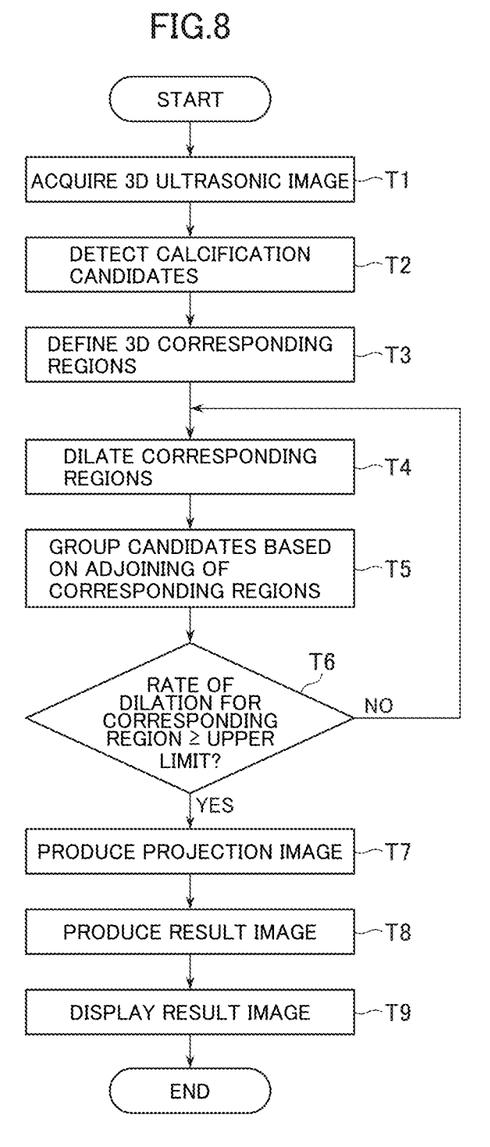
FIG. 8 is a flow chart showing microcalcification candidate display processing in the ultrasonic image display apparatus in accordance with the second embodiment.

FIG. 8 is a flow chart of microcalcification candidate display processing in the ultrasonic image display apparatus in accordance with the second embodiment.

At Step T1, the ultrasonic image acquiring section 51 acquires a 3D ultrasonic image as object to be processed by the microcalcification candidate detecting processing.

At Step T2, the microcalcification candidate detecting section 52 detects candidate regions of microcalcifications in the acquired 3D ultrasonic image.

At Step T3, the corresponding-region-for-candidate dilating section 53 defines a 3D corresponding region for calculation for each candidate region of microcalcifications, and also defines one group including that candidate region.

At Step T4, the corresponding-region-for-candidate dilating section 53 slightly dilates each corresponding region for calculation around its candidate region.

At Step T5, for each candidate region, once its corresponding region for calculation has come into contact with another corresponding region for calculation, the adjacent candidate grouping section 54 combines groups to which the candidate regions for the adjoining corresponding regions for calculation belong into one new group. The number of candidate regions in the new group is determined as summed value of the numbers of candidate regions in the groups before being combined.

At Step T6, the corresponding-region-for-candidate dilating section 53 decides whether a predefined upper limit rate is reached by the rate of dilation for the corresponding regions for calculation or not. When not reached, the process goes back to Step T4. When reached, the process goes to Step T7.

At Step T7, the grouping-result image producing section 55 projects the 3D ultrasonic image and the dilated corresponding regions for calculation for the candidate regions onto one arbitrary plane to produce their projection image.

At Step T8, the grouping-result image producing section 55 generates grouping-result image data, which expresses, for each group, at least one of the following: candidate regions themselves belonging to that group, dilated corresponding regions for calculation for the candidate regions, and a border enclosing the candidate regions, with color or brightness according to the number of candidate regions in that group in the projection image.

At Step T9, the display control section 6 displays a grouping-result image represented by the grouping-result image data.

According to the embodiments described above, for each detected candidate region of microcalcifications, its corresponding region for calculation is dilated, candidate regions whose corresponding regions come into contact with one another are grouped, and image data is generated, which expresses, for each group, at least one of the following: candidate regions belonging to that group, dilated corresponding regions for calculation for the candidate regions, and a border enclosing the candidate regions, with color or brightness according to the number of candidate regions in that group. Thus, distribution, especially, compactness, of individual detected candidate regions of microcalcifications, which is one type of information useful in image diagnosis of microcalcifications, can be intuitively recognized. Consequently, difficulty experienced by the operator in diagnosis can be mitigated.

Moreover, according to the embodiments described above, even in case that areas in which a plurality of candidate regions of microcalcifications are close-packed are present in an ultrasonic image at separate positions, the areas can be expressed and highlighted as separate clusters without being forcibly combined and highlighted within one detection border.

Further, according to the second embodiment described above, a projection image in which candidate regions of microcalcifications detected in a 3D ultrasonic image and information indicating their distribution are projected onto an arbitrary plane is produced; therefore, information on solid clusters of microcalcifications difficult to detect in a specific 2D cross-sectional plane may be observed.

It should be noted that the present invention is not limited to the embodiments described above, and several modifications may be made without departing from the spirit and scope of the invention.

For example, in the embodiments described above, an image to be processed is an ultrasonic image; however, it may be an image in another modality, such as a general X-ray radiographic image, an X-ray CT (Computed Tomography) image, a mammogram, or an MRI (Magnetic Resonance Imaging) image.

Moreover, for example, the embodiments described above refer to an image display apparatus comprising imaging means; however, an apparatus for displaying, without imaging means, at least one of the following: candidate regions of microcalcifications in an input image, dilated corresponding regions for calculation for the candidate regions, and a border enclosing the candidate regions, with color or brightness according to the number of the candidate regions may also constitute one embodiment of the present invention.

Further, for example, a program for causing a computer to operate as the aforementioned apparatus and a storage medium therefor may also each constitute one embodiment of the present invention.

What is claimed is:

1. A calcification display apparatus comprising:
   identifying means for identifying pixel regions representing possibly calcified tissue in an image;
   dilating means for dilating, for each said identified pixel region, a corresponding region including said pixel region;
   grouping means for combining said pixel regions pertaining to said dilated corresponding regions contiguously adjoining one another into one group; and
   display means for displaying, for each said group, at least one of the following: said pixel regions belonging to said group, dilated corresponding regions for said pixel regions, and a border enclosing said pixel regions, with color or brightness according to the number of said pixel regions belonging to said group.

2. The calcification display apparatus as recited in claim 1, wherein: said dilating means dilates said corresponding region around said pixel region for said corresponding region by up to a predefined rate of dilation.

3. The calcification display apparatus as recited in claim 2, wherein: said predefined rate of dilation is any value ranging from two to ten times.

4. The calcification display apparatus as recited in claim 1, wherein: said corresponding region has a circular or elliptical shape.

5. The calcification display apparatus as recited in claim 1, wherein:
   said image is a three-dimensional image,
   said corresponding region is a three-dimensional region, and
   said display means displays, for each said group, at least one of the following: said pixel regions belonging to said group, dilated ones of said corresponding regions for said pixel regions, and a border enclosing said pixel regions, with color or brightness according to the number of said pixel regions belonging to said group in a projection image in which said three-dimensional image is projected onto one plane.

6. The calcification display apparatus as recited in claim 1, wherein: said display means displays the number of said pixel regions belonging to said group in correspondence with said group.

7. The calcification display apparatus as recited in claim 1, wherein said image is an ultrasonic image.

8. The calcification display apparatus as recited in claim 1, wherein: said image is a radiographic image, a radiation tomographic image, or a magnetic resonance image.

9. An ultrasonic image display apparatus comprising:
   an ultrasonic probe;
   a transmitting/receiving section connected to the ultrasonic probe;
   an ultrasonic image processing section connected to the transmitting receiving section and configured to produce an ultrasonic image based on echo signals from the transmitting/receiving section;
   a display section;
   a display control section for displaying the ultrasonic image on the display section;
   and a calcification display apparatus comprising:
      identifying means for identifying pixel regions representing possibly calcified tissue in an image;
      dilating means for dilating, for each said identified pixel region, a corresponding region including said pixel region;
      grouping means for combining said pixel regions pertaining to said dilated corresponding regions contiguously adjoining one another into one group; and
      display means for displaying, for each said group, at least one of the following: said pixel regions belonging to said group, dilated corresponding regions for said pixel regions, and a border enclosing said pixel regions, with color or brightness according to the number of said pixel regions belonging to said group.

10. A method of identifying calcified tissue, the method comprising:
    identifying pixel regions representing possibly calcified tissue in an image;
    dilating, for each of the pixel regions, a corresponding region including each of the pixel regions;
    combining said pixel regions pertaining to said dilated corresponding regions contiguously adjoining one another into one group;
    displaying for each group at least one of the following: said pixel regions belonging to said group, dilated corresponding regions for said pixel regions, and a border enclosing said pixel regions, with color or brightness according to the number of said pixel regions belonging to said group.

* * * * *